United States Patent [19]
Lane

[11] Patent Number: 6,094,896
[45] Date of Patent: Aug. 1, 2000

[54] LAWN MOWER LAWN TRIMMER ASSEMBLY

[76] Inventor: Edward J. Lane, 61 Colby La., Wolcott, Conn. 06716

[21] Appl. No.: 09/113,775

[22] Filed: Jul. 10, 1998

[51] Int. Cl.[7] .................................................. A01D 34/44
[52] U.S. Cl. .......................................... 56/13.7; 56/DIG. 9
[58] Field of Search ............................ 56/121, 12.7, 13.6, 56/16.9, 13.7, DIG. 9

[56] References Cited

U.S. PATENT DOCUMENTS

| | | | |
|---|---|---|---|
| 3,782,085 | 1/1974 | Parker et al. | 56/16.9 |
| 3,805,499 | 4/1974 | Woelffer et al. | 56/202 |
| 4,170,099 | 10/1979 | Owens | 56/16.9 |
| 4,453,372 | 6/1984 | Remer | 56/13.7 |
| 4,466,235 | 8/1984 | Cole | 56/16.9 |
| 4,642,976 | 2/1987 | Owens | 56/16.9 |
| 4,663,920 | 5/1987 | Skovhoj | 56/12.7 |
| 4,715,169 | 12/1987 | Ould | 56/16.9 |
| 4,882,843 | 11/1989 | Baba | 30/276 |
| 4,896,488 | 1/1990 | Duncan et al. | 56/13.7 |
| 5,226,284 | 7/1993 | Meehleder | 56/16.9 |
| 5,497,606 | 3/1996 | Baxter | 56/16.9 |
| 5,694,752 | 12/1997 | Warfiled, III | 56/13.6 |

*Primary Examiner*—Thomas B. Will
*Assistant Examiner*—Meredith C. Petravick

[57] ABSTRACT

A lawn mower lawn trimmer assembly for allowing a user to easily trim weeds and grass while using a lawn mower. The inventive device includes a housing with a motor provided in the housing. The motor has a rotating shaft outwardly extending from the housing to which a trimming head is coupled. A mounting assembly is also provided for mounting to the front of a lawn mower. The mounting assembly has a base and a pair of arms. The base is designed for mounting to the lawn mower. Each of the arms is pivotally coupled to the base and to the housing so that the housing is pivotable between a lowered position and a raised position.

1 Claim, 2 Drawing Sheets

LAWN MOWER LAWN TRIMMER ASSEMBLY

BACKGROUND OF THE INVENTION

1. Field of the Invention

The present invention relates to lawn trimmer assemblies and more particularly pertains to a new lawn mower lawn trimmer assembly for allowing a user to easily trim weeds and grass while using a lawn mower.

2. Description of the Prior Art

The use of lawn trimmer assemblies is known in the prior art. More specifically, lawn trimmer assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art lawn trimmer assemblies include U.S. Pat. Nos. 5,048,276; 5,040,360; 5,167,108; 4,949,536; 3,407,579; and U.S. Pat. No. 3,319,406.

While these devices fulfill their respective, particular objectives and requirements, the aforementioned patents do not disclose a new lawn mower lawn trimmer assembly. The inventive device includes a housing with a motor provided in the housing. The motor has a rotating shaft outwardly extending from the housing to which a trimming head is coupled. A mounting assembly is also provided for mounting to the front of a lawn mower. The mounting assembly has a base, and a pair of arms. The base is designed for mounting to the lawn mower. Each of the arms is pivotally coupled to the base and to the housing so that the housing is pivotable between a lowered position and a raised position.

In these respects, the lawn mower lawn trimmer assembly according to the present invention substantially departs from the conventional concepts and designs of the prior art, and in so doing provides an apparatus primarily developed for the purpose of allowing a user to easily trim weeds and grass while using a lawn mower.

SUMMARY OF THE INVENTION

In view of the foregoing disadvantages inherent in the known types of lawn trimmer assemblies now present in the prior art, the present invention provides a new lawn mower lawn trimmer assembly construction wherein the same can be utilized for allowing a user to easily trim weeds and grass while using a lawn mower.

The general purpose of the present invention, which will be described subsequently in greater detail, is to provide a new lawn mower lawn trimmer assembly apparatus and method which has many of the advantages of the lawn trimmer assemblies mentioned heretofore and many novel features that result in a new lawn mower lawn trimmer assembly which is not anticipated, rendered obvious, suggested, or even implied by any of the prior art lawn trimmer assemblies, either alone or in any combination thereof.

To attain this, the present invention generally comprises a housing with a motor provided in the housing. The motor has a rotating shaft outwardly extending from the housing to which a trimming head is coupled. A mounting assembly is also provided for mounting to the front of a lawn mower. The mounting assembly has a base, and a pair of arms. The base is designed for mounting to the lawn mower. Each of the arms is pivotally coupled to the base and to the housing so that the housing is pivotable between a lowered position and a raised position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lawn mower lawn trimmer assembly apparatus and method which has many of the advantages of the lawn trimmer assemblies mentioned heretofore and many novel features that result in a new lawn mower lawn trimmer assembly which is not anticipated, rendered obvious, suggested, or even implied by any of the prior art lawn trimmer assemblies, either alone or in any combination thereof.

It is another object of the present invention to provide a new lawn mower lawn trimmer assembly which may be easily and efficiently manufactured and marketed.

It is a further object of the present invention to provide a new lawn mower lawn trimmer assembly which is of a durable and reliable construction.

An even further object of the present invention is to provide a new lawn mower lawn trimmer assembly which is susceptible of a low cost of manufacture with regard to both materials and labor, and which accordingly is then susceptible of low prices of sale to the consuming public, thereby making such lawn mower lawn trimmer assembly economically available to the buying public.

Still yet another object of the present invention is to provide a new lawn mower lawn trimmer assembly which provides in the apparatuses and methods of the prior art some of the advantages thereof, while simultaneously overcoming some of the disadvantages normally associated therewith.

Still another object of the present invention is to provide a new lawn mower lawn trimmer assembly for allowing a user to easily trim weeds and grass while using a lawn mower.

Yet another object of the present invention is to provide a new lawn mower lawn trimmer assembly which includes a housing with a motor provided in the housing. The motor has a rotating shaft outwardly extending from the housing to which a trimming head is coupled. A mounting assembly is also provided for mounting to the front of a lawn mower. The mounting assembly has a base, and a pair of arms. The base is designed for mounting to the lawn mower. Each of the arms is pivotally coupled to the base and to the housing so that the housing is pivotable between a lowered position and a raised position.

Still yet another object of the present invention is to provide a new lawn mower lawn trimmer assembly that is pivotable so that it can be easily retracted when not in use so that it is not a hindrance to using the lawn mower in restrictive spaces or near obstacles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
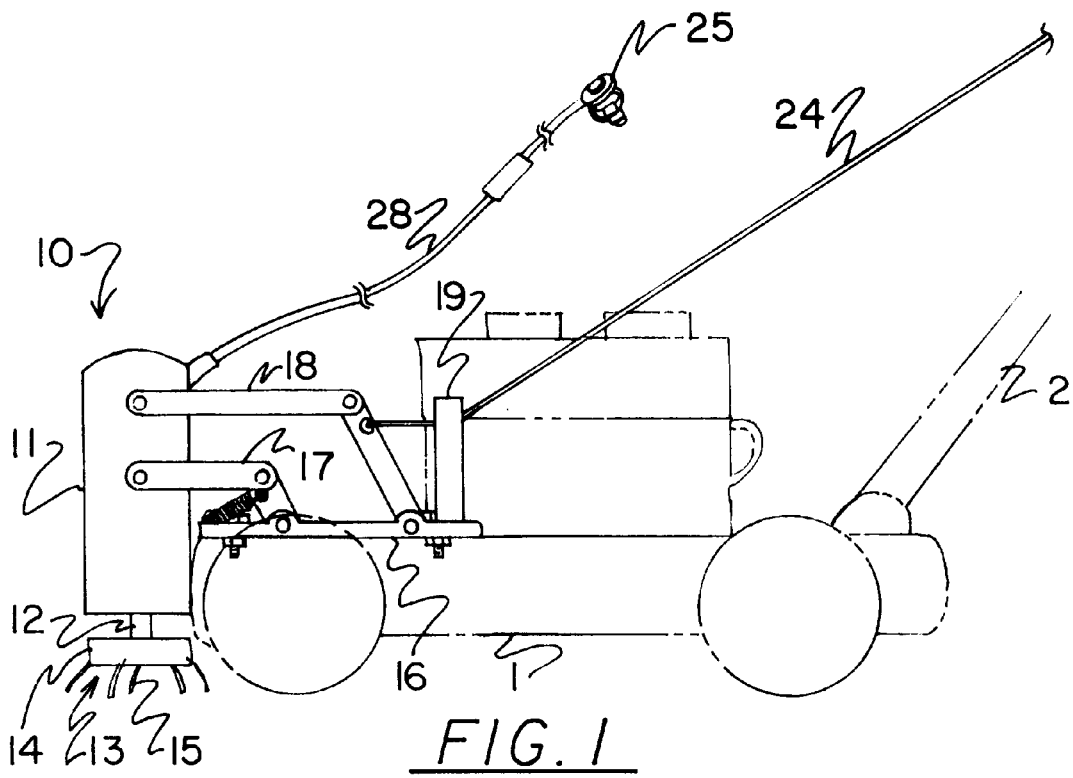
FIG. 1 is a schematic side view of a new lawn mower lawn trimmer assembly in the lowered position according to the present invention.

With reference now to the drawings, and in particular to FIGS. 1 through 4 thereof, a new lawn mower lawn trimmer assembly embodying the principles and concepts of the present invention and generally designated by the reference numeral 10 will be described.

In use, the trimmer assembly 10 is designed for mounting to the front of a lawn mower 1 having a rearwards extending handle 2. As best illustrated in FIGS. 1 through 4, the lawn mower lawn trimmer assembly 10 generally comprises a housing 11 with a motor provided in the housing 11. The motor has a rotating shaft 12 outwardly extending from the housing 11 to which a trimming head 13 is coupled. A mounting assembly is also provided for mounting to the front of a lawn mower 1. The mounting assembly has a base 16, and a pair of arms 17,18. The base 16 is designed for mounting to the lawn mower 1. Each of the arms 17,18 is pivotally coupled to the base 16 and to the housing 11 so that the housing 11 is pivotable between a lowered position and a raised position.

In closer detail, the trimmer assembly 10 includes a housing 11 having a motor is provided therein. The motor has a rotating shaft 12 outwardly extending from the housing 11 which is rotated by the motor when it is energized. A trimming head 13 is coupled to the rotating shaft 12 of the motor. Preferably, the trimming head 13 comprises a spool 14 with a trimming filament 15 outwardly extending therefrom. The trimming filament 15 is designed for cutting vegetation as the trimming head 13 is rotated by the rotating shaft 12 of the motor.

Figure 3:
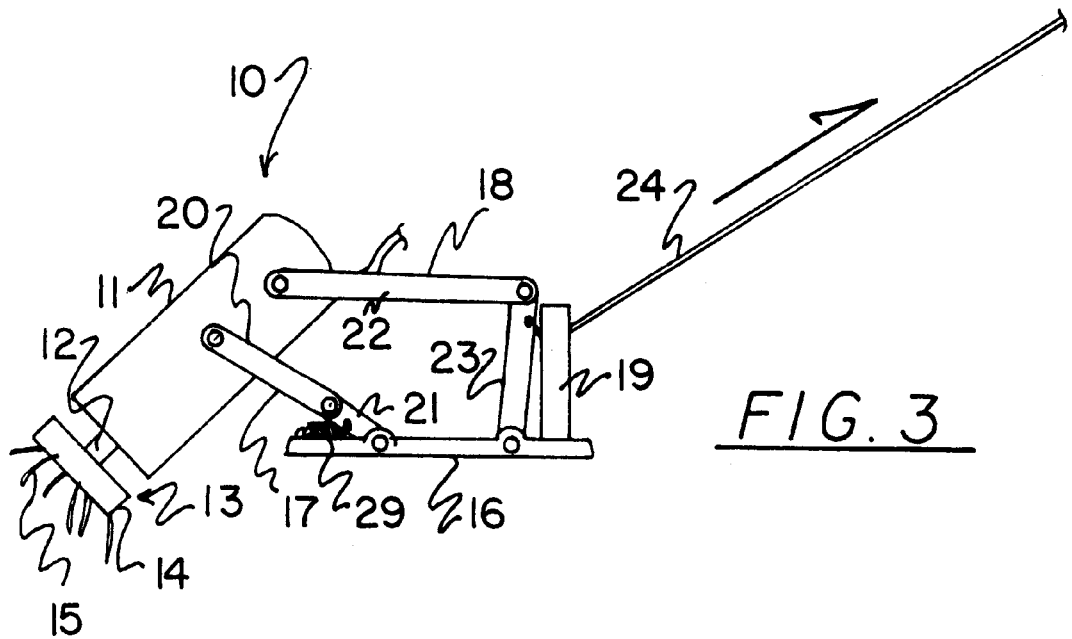
FIG. 3 is a schematic side view of the present invention being pivoted towards the raised position.

The mounting assembly is designed for mounting the trimmer assembly 10 to the front of a lawn mower 1. The mounting assembly preferably has a base 16, a pair of arms 17,18, and a guide member 19. As illustrated in FIG. 1, the base 16 is designed for mounting to a lawn mower 1 by fasteners (such as bolts). Each of the arms 17,18 has first and second ends and a pair of pivotally coupled portions 20,21, 22,23. The first ends of the arms 17,18 are pivotally coupled to the base 16 while the second ends of the arms 17,18 are pivotally coupled to the housing 11. This permits pivoting of the housing between a lowered position (FIG. 1) and a raised position (FIG. 3). In use, the trimming head 13 is preferably positioned adjacent the ground surface when the housing 11 is in the lowered position so that the trimming head 13 can be used to vegetation in front of the lawn mower 1. As illustrated in FIG. 3, in use, the trimming head 13 is pivoted away from the ground surface when the housing 11 is pivoted towards the raised position so that the trimming head 13 is retracted out to the way of the front of the lawn mower 1 when needed.

Preferably, a spring 29 is coupled the base 16 and to one of the portions 21 of one of the arms 17. The spring 29 biases the housing 11 towards the lowered position. One end of an elongate flexible line 24 is coupled to one of the portions 23 of the other arm. The guide member 19 has a bore through which the flexible line 24 is extended so that the other end of the flexible line 24 may be attached to the handle 2 of the lawn mower 1. In use, the flexible line 24 may be pulled by a user to allow the user to pivot the housing 11 towards the raised position as illustrated in FIG. 3.

Figure 2:
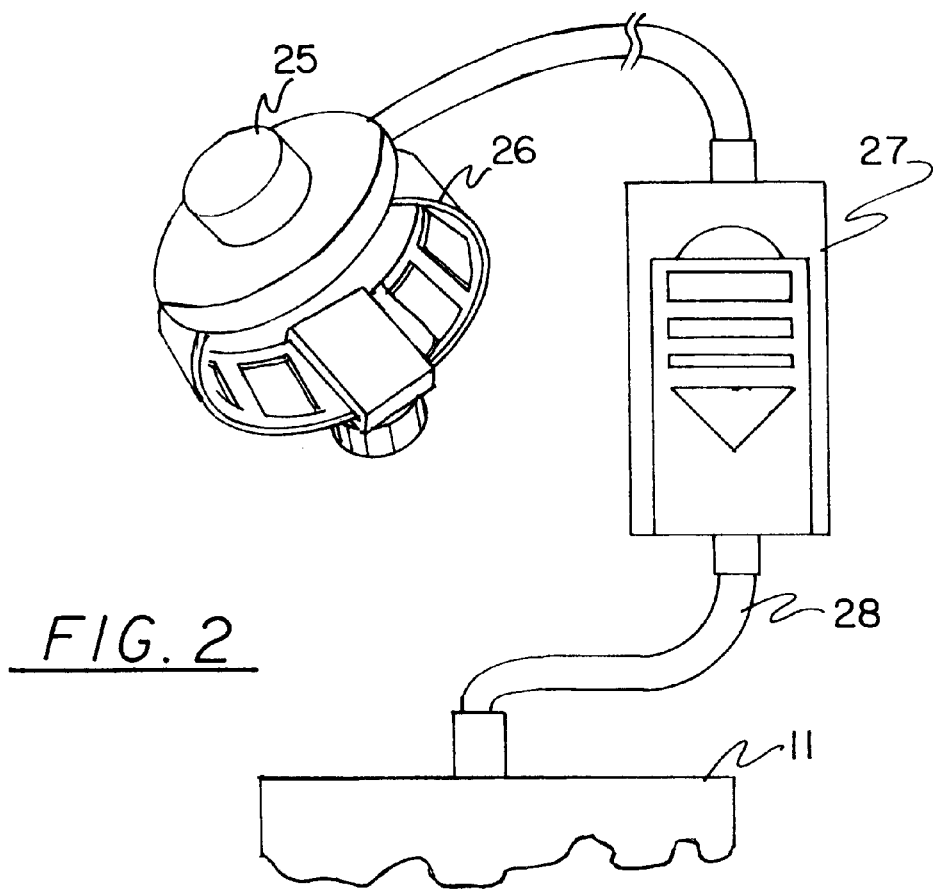
FIG. 2 is a schematic perspective view of the switch of the present invention.

With reference to FIG. 2, a switch 25 is also preferably provided for permitting selective energizing of the motor. The switch 25 is electrically connect to the motor preferably by an elongate wire 28 so that the switch 25 is mountable to the handle 2 of the lawn mower 1. Ideally, the switch 25 has an attachment band 26 for attachment of the switch 25 to the handle 2 of the lawn mower 1. A power source 27 electrically connected to the motor is also preferably provided for providing energy to the motor. Ideally, the power source 27 comprises a battery which is connected to the wire 28 connecting the switch 25 to the motor. Even more ideally, the power source comprises a rechargeable battery housed in a battery housing on the wire 28 between the switch 25 and the motor.

Figure 4:
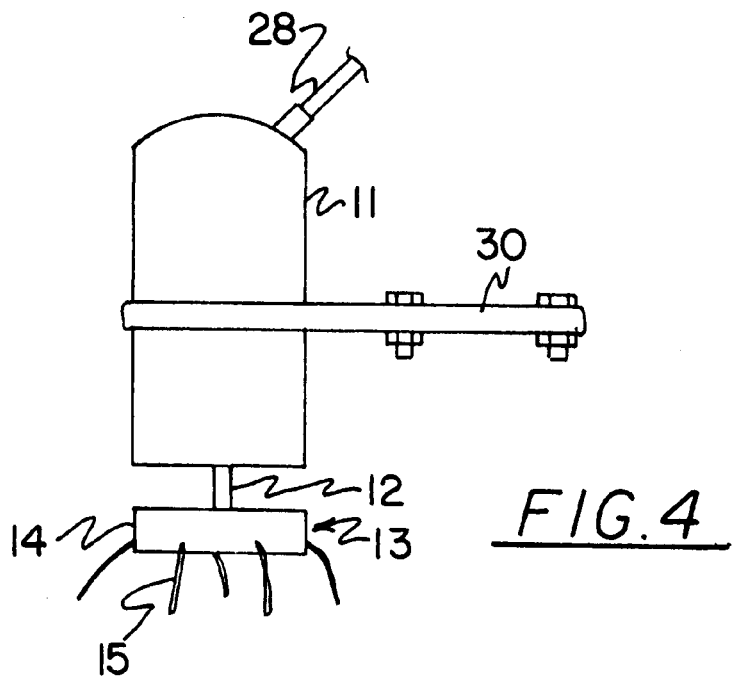
FIG. 4 is a schematic side view of the optional fixed embodiment of the present invention.

FIG. 4, illustrates an optional fixed embodiment of the device with a single mounting arm 30 which is either mountable directly to the lawn mower 1 or to the base 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A lawn mowing and trimming system comprising:

a lawn mower having a deck with a top surface and a front wall, said lawn mower having a rearwards extending handle mounted on the top surface of said deck, and a trimmer assembly mounted on the deck of said lawn mower, said trimmer assembly comprising:

a housing;

a motor being provided in said housing, said motor having a rotating shaft outwardly extending from said housing;

a trimming head being coupled to said rotating shaft of said motor, said trimming head comprising a spool having a trimming filament outwardly extending from said spool and lying in a cutting plane;

a mounting assembly mounted to the top surface of said lawn mower, said mounting assembly having a base, a pair of arms, and a guide member;

said base being mounted on the top surface of said lawn mower;

each of said arms having first and second ends and a pair of pivotally coupled portions, said first end of each of said arms being pivotally coupled to said base, said second ends of said arms being pivotally coupled to said housing such that said housing is positioned adjacent the front of the lawn mower;

said housing being pivotable between a lowered position and a raised position, wherein said trimming head is positioned adjacent the ground surface with said cutting plane oriented parallel to said ground surface when said housing is in said lowered position, wherein said trimming head is pivoted away from said lawn mower and upwardly from the ground surface for increasing a distance between said trimming head and the ground surface when said housing is pivoted towards said raised position, said housing having a lower end adjacent said trimming head, said lower end of said housing abutting against the front wall of said lawn mower when said housing is in said lowered position;

a spring being coupled said base and to one of said portions of one of said arms, said spring biasing said housing towards said lowered position;

an elongate flexible line having a pair of opposite ends, one of said ends of said flexible line being coupled to one of said portions of one of said arms;

said guide member having a bore therethrough, said flexible line being extended through said bore of said guide member, another of said ends of said flexible line being attached to the handle of the lawn mower;

a switch being electrically connect to said motor, said switch being mounted to the handle of the lawn mower; and a power source being electrically connected to said motor, wherein said power source comprises a battery.

* * * * *